1,911,115

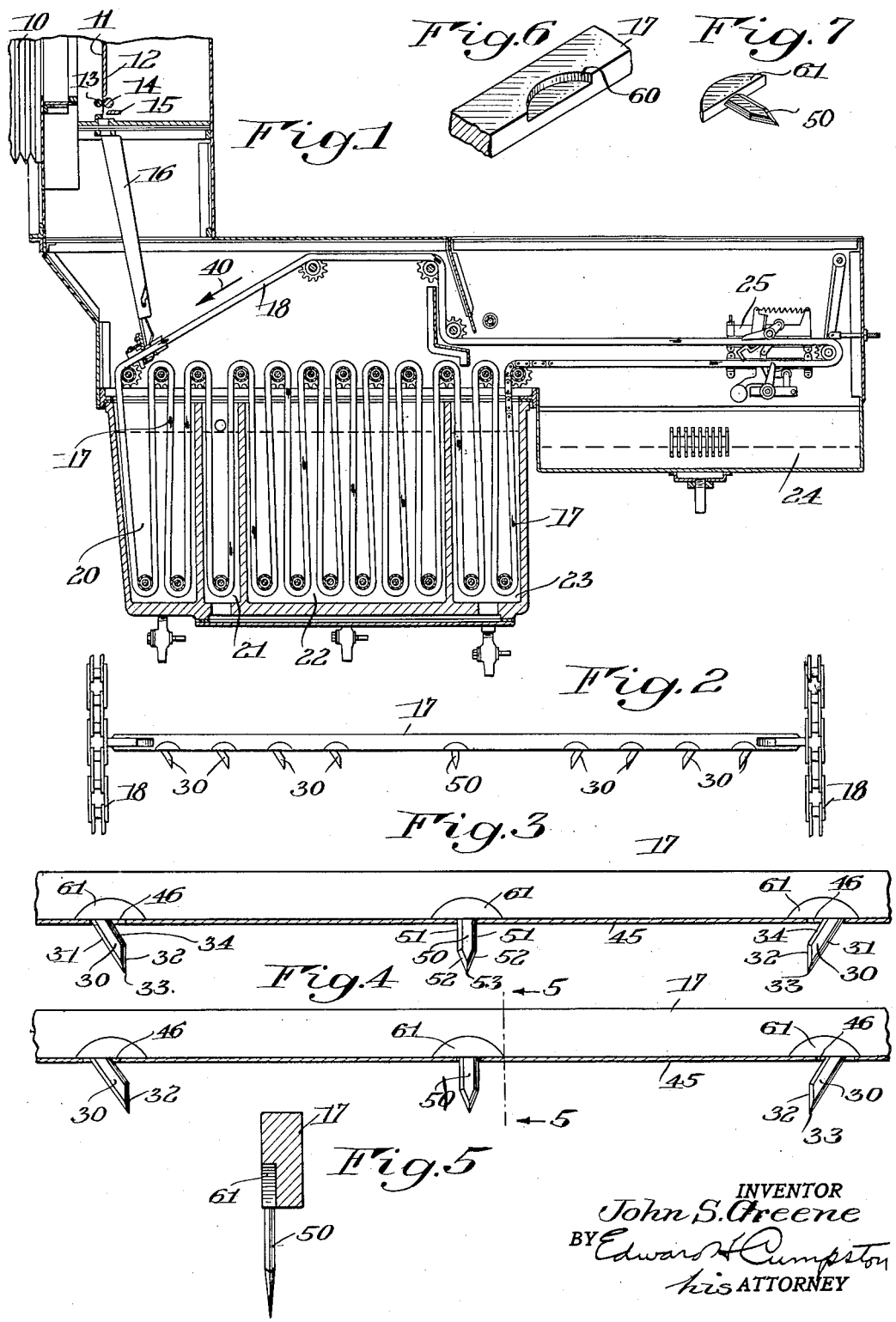
May 23, 1933. J. S. GREENE 1,911,115
PHOTOGRAPHIC PRINT HANDLING MEANS
Filed Aug. 30, 1932
INVENTOR
John S. Greene
BY Edward H. Cumpston
his ATTORNEY Patented May 23, 1933

UNITED STATES PATENT OFFICE

JOHN S. GREENE, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC PRINT HANDLING MEANS

Application filed August 30, 1932. Serial No. 631,066.

This invention relates to photographic print handling means useful, for example, in certain types of apparatus known as "commercial cameras", although the improvements of the present invention are capable also of other uses. In certain commercial cameras, a sheet of sensitized photographic material after being exposed to rays of light is picked up and carried into one or more liquid treating baths, such for example as developing, fixing, and washing baths.

An object of the invention is the provision of improved and more satisfactory means for picking up and conveying photographic prints, which means is especially useful in connection with the forms of cameras just described.

When the exposed photographic print comprises a sensitized sheet of paper or the like, as is usually the case, the wetting of the print in the treating baths causes it to expand somewhat. Another object of the invention is the provision of print handling means especially adapted for holding and properly conveying a print which tends to expand in this manner and which will allow the print to remain smooth instead of buckling upon expansion.

A further object of the invention is the provision of handling means from which a print may be readily stripped when desired, and on which it is nevertheless held securely until the stripping operation is to be performed.

To these and other ends the invention resides in certain improvements and combinations of parts, all as will be hereinafter more fully described, the novel features being pointed out in the claims at the end of the specification.

In the drawing:

Fig. 1 is a longitudinal vertical section through one possible embodiment of a commercial camera to which the improvements of the present invention are especially applicable;

Fig. 2 is a plan of part of the print conveying means of the apparatus shown in Fig. 1, illustrating the improvements of the present invention;

Fig. 3 is a plan on a larger scale of a fragment of the pin bar shown in Fig. 2, illustrating in section a photographic print in the position it occupies immediately after being impaled on the pins;

Fig 4 is a similar view showing the position of the print after it expands upon being wetted in one of the treating baths;

Fig. 5 is a transverse section substantially on the line 5—5 of Fig. 4;

Fig. 6 is a perspective view of a portion of the pin bar illustrating the recess in which the pin is seated, and Fig. 7 is a perspective view of a pin ready to be attached to the pin bar.

The same reference numerals throughout the several views indicate the same parts.

The invention can be applied, for example, to any suitable type of commercial camera such as that illustrated, for instance, in United States Letters Patent No. 1,777,488, granted October 7, 1930, for an invention of John S. Greene in Photographic apparatus. Referring to Fig. 1 of the present drawing, such a commercial camera may comprise a suitable exposure apparatus including bellows 10 forming a dark chamber to which light may be admitted when desired by a shutter or the like so as to fall upon a sheet 11 of sensitized photographic material such as paper held in the focal plane of the camera and lying upon a focal plane support 12. After exposure, the sensitized material 11 may be fed downwardly by suitable means such as the feed rollers 13 and 14, the exposed portion may be severed from the remaining unexposed portion by suitable severing means such as the knife 15, and the exposed portion of the print may be received and held in suitable print holding mechanism such as the chute 16. There it is picked up by being impaled on impaling devices mounted on a pin bar 17 attached at each end to one of a pair of endless members 18 preferably in the form of chains running over suitable guiding rollers and sprockets so that the print is impaled on the impaling devices and drawn thereby out of the chute 16 and downwardly into a suitable print treating bath such as a developing solution contained within the compartment 20. After passing one or several times through the developing bath and being developed to the required extent, continuous or intermittent motion of the chains 18 may carry the print on to a washing bath 21, thence to a fixing bath 22, thence to another washing bath 23, and finally to a position over a washing bath 24 into which the print is dropped when it is stripped from the impaling pins by suitable stripping mechanism indicated in general by the numeral 25.

Various details of the complete apparatus, which do not form a part of the present invention and need not be described in detail here, are fully disclosed in the aforesaid Greene patent and various other United States patents.

When the print is being held in the holding mechanism 16 ready to be picked up by the conveying mechanism, it is still in a dry condition. After the conveying mechanism picks up the print and conveys it to the first of the liquid treating baths, the print becomes wetted, of course, and the moisture permeating the sheet of paper or the like causes it to expand somewhat. In some previous forms of impaling devices, the print upon expansion has a tendency to buckle between the impaling devices. The present invention provides improved impaling devices which not only tend to smooth the print laterally when it is being impaled in a dry condition upon the device, but also allow free expansion of the print when it becomes wet, so that it will lie flat without buckling.

To this end, the improved impaling devices of the present invention are formed as shown especially in Figs. 2 to 5 inclusive of the present drawing. Each pin bar is provided with a plurality of pins or impaling devices each indicated in general by the numeral 30. As will be readily seen, those impaling devices adjacent each end of the pin bar 17 are arranged at an acute angle to the bar so as to slant towards the center of the bar. They also may be described as converging toward each other; that is, the impaling devices adjacent one end of the bar converge toward those adjacent the other end of the bar in a direction from the bases of the pins toward their points. Or, stating it reversely, the pins at one end of the bar diverge from those at the other end of bar in a direction from their points toward their bases.

Each pin is preferably relatively thin, as shown especially in Fig. 5 of the drawing, so as to cut a relatively narrow slit in the photographic print, but is relatively broad so as to have a substantial bearing area on the sides of the slit cut in the print, thus holding the print securely and preventing it from tearing away from the pins accidentally. Each pin or impaling device preferably has a sharpened cutting edge 31 slanting from the point of the pin outwardly away from the center of the pin bar, and another cutting edge 32 at an angle to the edge 31 so that these two edges meet in a sharp point 33 which initially contacts with the photographic print and has no difficulty in piercing it. The cutting edge 32 may, as shown, be substantially perpendicular to the axis of the pin bar 17.

The edge of each impaling device towards the center of the pin bar, that is, the edge a part of which is indicated by the numeral 32, is preferably undercut or cut away as shown in the drawing so that the outer end of the pin may be described as overhanging. The undercut edge is also a sharp cutting edge and is indicated in the drawing by the numeral 34.

It will be readily understood by those skilled in the art that when the chains 18 are driven by any suitable mechanism in the direction of the arrow 40 (Fig. 1) the pins 30 project from the forward edge of the pin bar 17 and pierce the print in the chute 16 slightly above the lower edge of the print so that the print becomes impaled on the pins or impaling devices 30. The shape of the impaling devices has a tendency to stretch the print laterally (or along the axis of the pin bar 17) since the slanting edges 31 of the pin or pins near one end of the pin bar will tend to pull that edge of the print toward that end of the pin bar, while the similar but reversely inclined slanting edges 31 of the pin or pins near the other end of the pin bar will tend to pull the other edge of the print in the opposite direction. Thus the print will be stretched laterally so that it will lie smoothly without wrinkles.

The print when fully impaled upon the pins in this dry condition occupies substantially the position shown at 45 in Fig. 3 of the drawing, the slits 46 cut by the pins being plainly indicated in this figure.

Then when the continued motion of the pin bar 17 draws the print out of the chute 16 and carries it downwardly into the first liquid treating bath, the print becomes wetted and the paper or similar material of which it is made tends to expand. If the print could not be moved readily relatively to the pins, it is obvious that the expansion of the print might cause it to buckle between the pins. With the improved pins of the present invention, however, the print may move readily to a limited extent and thus buckling is avoided. As the print expands, the inner end of the slot 46 (that is, the end toward the center of the print) can move into the space provided by the undercut inner edge of the pin, so that the uncut part of the print comes under the overhanging end of the pin, as shown in Fig. 4. Since the pin during the initial impaling of the print, has already cut a slit wider than the shank of the pin, no further cutting of the print is necessary during this expansion. Thus little resistance is offered to the expansion of the print, and the stiffness of the sheet material is sufficient to prevent it from buckling and to cause it to move relative to the pins, whereas such stiffness alone would not be sufficient to prevent buckling if the pins were of the type usually heretofore employed.

When the time comes for the print to be stripped from the pins by the stripping mechanism indicated in general at 25, the print may be readily stripped from the pins notwithstanding the fact that it has expanded as shown in Fig. 4, since the undercut or overhanging edge 34 of each pin has a sharpened edge and if necessary will readily cut the slit 46 slightly longer as the print comes off of the pins, without tearing the print.

If desired, an additional pin may be provided adjacent the center of the pin bar in addition to the pins nearer the ends, and this pin need not be inclined but may be straight, as indicated at 50 in the drawing. It may have sharpened side edges 51 which, toward the point of the pin, converge as at 52 to provide a sharp point 53.

Although the center pin 50, if employed, may be straight or substantially perpendicular to the axis of the pin bar 17, nevertheless it may be properly described as converging toward any of the other pins, since the axis of the pin 50 converges toward the axes of any of the other pins.

Preferably all of the pins lie substantially in a single plane.

As an improved and convenient way of manufacturing the pin bar and impaling devices, the pin bar is preferably provided with a series of arcuate recesses as indicated, for example, at 60 in Fig. 6, and each pin or impaling device itself is preferably formed integrally with a piece 61 of arcuate shape and of the right size to fit snugly in the recess 60 and to be retained therein by suitable means such as welding or soldering.

As will be understood by those skilled in the art, the chains 18 are preferably provided with a series of pin bars 17 spaced at intervals along the lengths of the chains, so that when the chains are properly driven (either continuously or intermittently) one pin bar after another moves toward and past the chute 17 to pick up one after another of successive photographic prints deposited in the chute and to carry them successively through the various treating baths.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

I claim:

1. Photographic print handling apparatus comprising a pick-up member and a plurality of print impaling devices mounted on said member, certain of said devices extending in a direction converging toward certain other of said devices.

2. Photographic print handling apparatus comprising a pick-up member, a print impaling device mounted on said member adjacent one end thereof, and another print impaling device mounted on said member adjacent another end thereof, said impaling devices extending in directions converging toward each other.

3. Photographic print handling apparatus comprising means for picking up a photographic print and conveying it into a liquid bath, said means including a plurality of print impaling devices spaced from each other and extending in directions converging toward each other.

4. Photographic print handling apparatus comprising means for picking up a photographic print and conveying it into a liquid bath, said means including a plurality of thin sharp print impaling devices for piercing and cutting a narrow slit in a print, an edge of one of said devices being undercut so that adjacent the base of said device said edge will be spaced from the end of the slit cut by said device and so that the print may move slightly relatively to said device when the print tends to expand upon being wetted in said liquid bath.

5. Photographic print handling means comprising a bar having a plurality of print impaling pins mounted thereon, at least one of said pins being thin and sharp and being placed at an angle to said bar so as to cut a narrow slit longer than the width of said pin in a print impaled thereon.

6. Photographic print handling means comprising a bar having a plurality of print impaling pins mounted thereon, at least one of said pins being thin and sharp and having its edge toward another of said pins undercut and its edge away from said other of said pins sloped at an acute angle to said bar.

7. Photographic print handling means comprising a bar having a plurality of print impaling devices mounted thereon and spaced from each other, said devices being relatively thin so as to cut relatively narrow slits in a print impaled by said devices, certain of said devices being closer to each other adjacent their outer ends than adjacent their bases, so that a print impaled on said devices and lying adjacent their bases may expand somewhat between said certain of said devices without buckling.

8. Photographic print handling means comprising a bar having a plurality of print impaling devices mounted thereon and spaced from each other, one of said devices having an edge which is undercut to provide an overhanging portion, said undercut edge being sharpened so that it may readily cut an impaled print being removed from said device if said overhanging portion of said device overlies an uncut portion of said print.

9. Photographic print handling apparatus comprising print holding mechanism, means for holding a print treating bath, and print conveying means for picking up a print from said holding mechanism and moving it into said bath, said conveying means including a pair of endless members each movable through a closed path of travel passing adjacent said holding mechanism, a cross bar extending transversely between said endless members and attached to both of them to move with them, and a plurality of print impaling devices mounted on said bar and extending forwardly with respect to the direction of travel thereof, to impale a print held in said holding mechanism and to carry it into said bath, at least one of said impaling devices having a thin cutting edge to cut a narrow slit in a print being impaled thereon and having a shank narrower adjacent its base than the length of the slit cut in the print, so that when said print tends to expand upon becoming wetted in said bath, it may readily move laterally with respect to said impaling device through a limited extent.

JOHN S. GREENE.